United States Patent [19]

Ukita et al.

[11] Patent Number: 5,485,061
[45] Date of Patent: Jan. 16, 1996

[54] DISCHARGE LAMP LIGHTING DEVICE CAPABLE OF PREVENTING A FLICKER DUE TO ARC MOVEMENT

[75] Inventors: Nobuo Ukita; Kenji Nakamura; Takashi Ohsawa; Yasumasa Hanazaki, all of Hyogo, Japan

[73] Assignee: Mitsubishi Denki Kabushiki Kaisha, Tokyo, Japan

[21] Appl. No.: 225,985

[22] Filed: Apr. 12, 1994

[30] Foreign Application Priority Data

Apr. 12, 1993 [JP] Japan ................... 5-109958

[51] Int. Cl.⁶ .................................... H05B 41/14
[52] U.S. Cl. ................. 315/307; 315/209 R; 315/82; 315/DIG. 7
[58] Field of Search ................ 315/82, 308, 224, 315/209 R, 247, DIG. 7, 307, DIG. 5

[56] References Cited

U.S. PATENT DOCUMENTS 5,142,203  8/1992  Oda et al. ......................... 315/308
5,233,273  8/1993  Waki et al. ........................ 315/224
5,365,152  11/1994 Ozawa et al. ..................... 315/291

FOREIGN PATENT DOCUMENTS 4212292  8/1992  Japan.

Primary Examiner—Robert J. Pascal
Assistant Examiner—David H. Vu
Attorney, Agent, or Firm—Sughrue, Mion, Zinn, Macpeak & Seas; Richard C. Turner; Peter A. McKenna

[57] ABSTRACT

An inverter circuit produces a proper electric power to be supplied to a discharge lamp. A feedback control system detects a lamp voltage and a lamp current, or a lamp power of the discharge lamp, and feedback-controls the inverter circuit based on the detected at least one of the lamp voltage, lamp current and lamp power. A response switching circuit switches a response speed of the feedback control system so that the response speed is high in a low luminous efficiency region, and is low in a high luminous efficiency region.

6 Claims, 10 Drawing Sheets

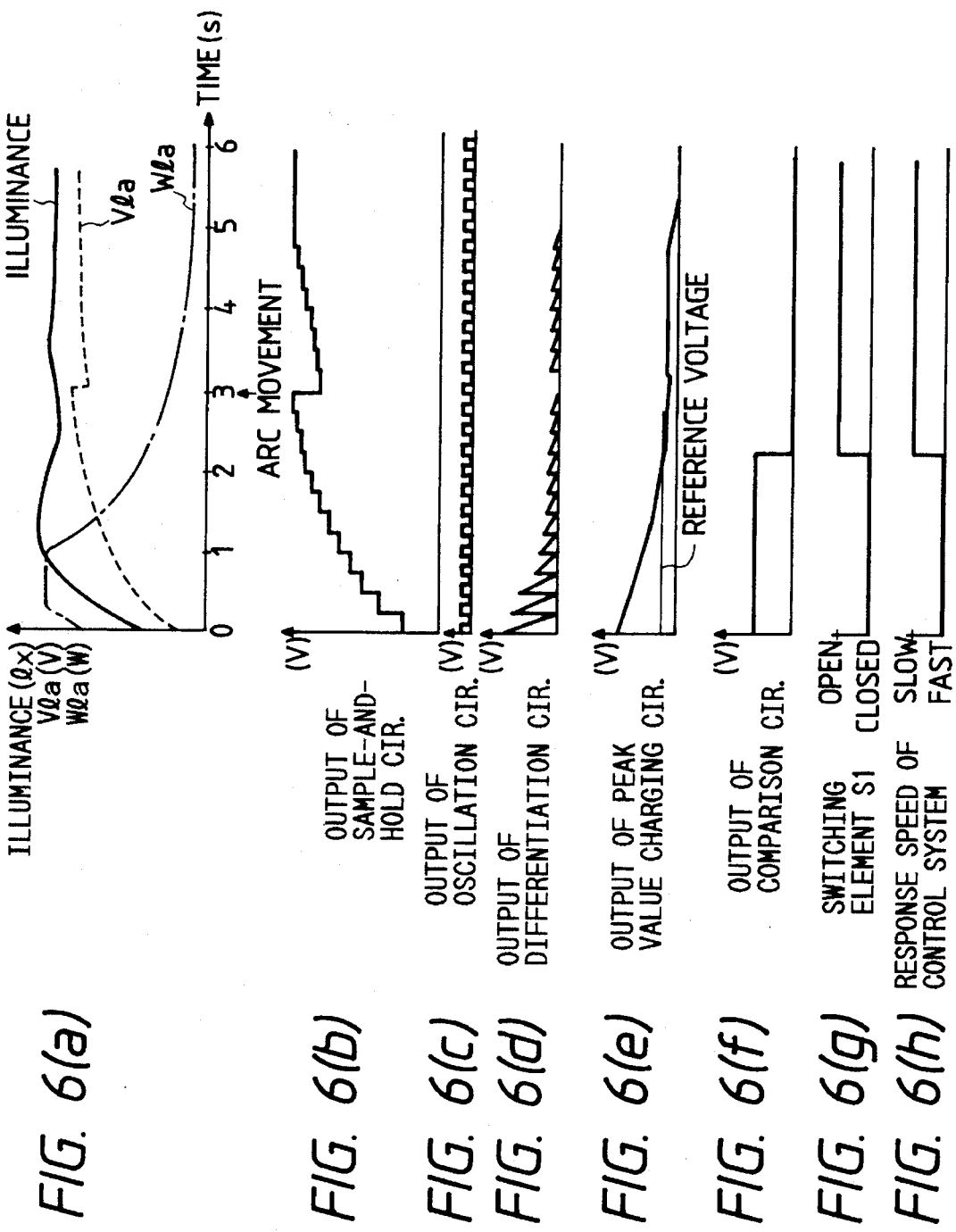

DISCHARGE LAMP LIGHTING DEVICE CAPABLE OF PREVENTING A FLICKER DUE TO ARC MOVEMENT

BACKGROUND OF THE INVENTION

The present invention relates to a discharge lamp lighting device which can light, without causing a flicker, high-voltage discharge lamps such as a metal halide lamp, which is used for a vehicular headlight etc.

There is a discharge lamp lighting device which has an inverter circuit for supplying electric power to a discharge lamp by a switching operation of a semiconductor switching element, and a feedback control system for feedback-controlling the switching element of the inverter circuit to supply necessary power by detecting a lamp voltage, a lamp current or a lamp power of the discharge lamp.

Conventional feedback systems have a response that involves a delay of the circuit itself and a delay due to phase compensation. The response remains the same from the lighting start to the stable lighting operation of a discharge lamp.

In the ordinary discharge lamp lighting control method, low power is supplied to a discharge lamp at the start and the rated lamp power is supplied during a stable operation. In this method, the control is so made that it takes several minutes from the cold start (the discharge lamp is started when it is cold) to the stable lighting, i.e., to a time point at which the light output of the discharge lamp reaches 100%. Since characteristics of the discharge lamp vary very slowly, a flicker, which is caused by a movement of a discharge arc on the discharge lamp electrodes, is not a problem.

However, in a discharge lamp lighting device for, for instance, a discharge lamp used for a vehicular headlight, the control is so made that it takes only a short time of about one second from the cold start to the stable lighting. In this case, as shown in FIG. 15, a high lamp power Wla is supplied to a discharge lamp from the start to vary the discharge lamp characteristics fast by quickly vaporizing mercury and metal halide that are sealed in a tube.

Therefore, as shown in FIG. 12, discharging points of a discharge arc 3 between a pair of electrodes 1 and 2 frequently change on the electrodes 1 and 2 during the process from the lighting start to the stable lighting due to, for instance, vaporization of mercury sticking to the electrodes in the tube and a phenomenon that thermal conduction makes a temperature distribution uniform in an area including the discharge point.

The change of discharge points means a change of a discharge arc length l. There exists the following relationship among a lamp voltage Vla, a lamp current Ila and the discharge arc length l:

$$Vla = a + bl + (c+dl)/Ila$$

where a, b, c and d are constants that depend on an electrode material. Therefore, if the lamp current Ila is constant, the lamp voltage Vla increases as the discharge arc becomes longer and decreases as the discharge arc becomes shorter.

A specific description will be made of an example. Immediately after the cold start, the lamp voltage Vla is low (about 20V) because the mercury vapor pressure in the tube is low. Then, as the mercury vapor pressure increases by vaporization of mercury that has received arc discharge energy, the lamp voltage Vla increases and is stabilized at a certain value (e.g., about 90V).

FIG. 13 shows a control characteristic with respect to the lamp voltage Vla, and FIG. 14 shows a relationship between the lamp voltage Vla and the luminous efficiency of a discharge lamp (L/P value, which is illuminance Ix/lamp power Wla).

As shown in FIG. 14, the luminous efficiency of the discharge lamp is low in the region where the lamp voltage Vla is low, and is high in the region where the lamp voltage Vla is high. Therefore, the illuminance can be made constant by supplying power to the discharge lamp in accordance with the luminous efficiency, which varies with the lamp voltage Vla. The control characteristic of FIG. 13 is of such a type.

Now, we will consider a case where the discharge points of the arc 3 on the electrodes 1 and 2 move to such directions as reduce the discharge arc length l, for instance, at a time point of Vla= 80 V while the lamp voltage Vla increases from the lighting start. In this case, the lamp voltage Vla suddenly changes by −ΔVla that corresponds to a decrease of the arc length l. In response, the feedback control system controls the inverter circuit in accordance with the control characteristic of FIG. 13 so that the lamp power being supplied to the discharge lamp is changed by +ΔWla that corresponds to the variation −ΔVla. As a result, as shown in FIG. 15, the light output of the discharge lamp is increased by an amount corresponding to the power variation +ΔWla, to cause an illuminance variation +Δlx. This sudden change of the discharge lamp illuminance is recognized as a flicker through human eyes.

SUMMARY OF THE INVENTION

In view of the above problem in the art, an object of the present invention is to provide a high-voltage discharge lamp lighting device which can prevent a flicker of a discharge lamp that would otherwise be caused by a movement of discharge points of a discharge arc on electrodes.

According to the invention, a discharge lamp lighting device comprises:

an inverter circuit for producing a proper electric power to be supplied to a discharge lamp;

a feedback control system for detecting a lamp voltage and a lamp current, or a lamp power of the discharge lamp, and for feedback-controlling the inverter circuit based on the detected at least one of the lamp voltage, lamp current and lamp power; and a response switching circuit for switching a response speed of the feedback control system so that the response speed is high in a low luminous efficiency region, and is low in a high luminous efficiency region.

With the above constitution, even if the lamp voltage is changed due to a movement of arc discharge points on electrodes of the discharge lamp when the luminous efficiency is high, the feedback control system, which is in the slow-response state, controls the inverter circuit slowly and, accordingly, the inverter circuit produces a slowly changing electric power.

Therefore, even in the high luminous efficiency region, the illuminance of the discharge lamp changes slowly and such an illuminance change is not recognized by human eyes. On the other hand, in the low luminous efficiency region, the lamp voltage increases in a short period and the discharge lamp characteristics change quickly. However, since the feedback control system has the high response speed, the control operation can be effected correctly without an undue delay.

BRIEF DESCRIPTION OF THE DRAWINGS

FIGS. 6(a)–6(h) are waveform diagrams showing the operation of the discharge lamp lighting device of the second embodiment;

DESCRIPTION OF THE PREFERRED EMBODIMENTS

Embodiments of the present invention will be described with reference to the accompanying drawings.

Figure 1:
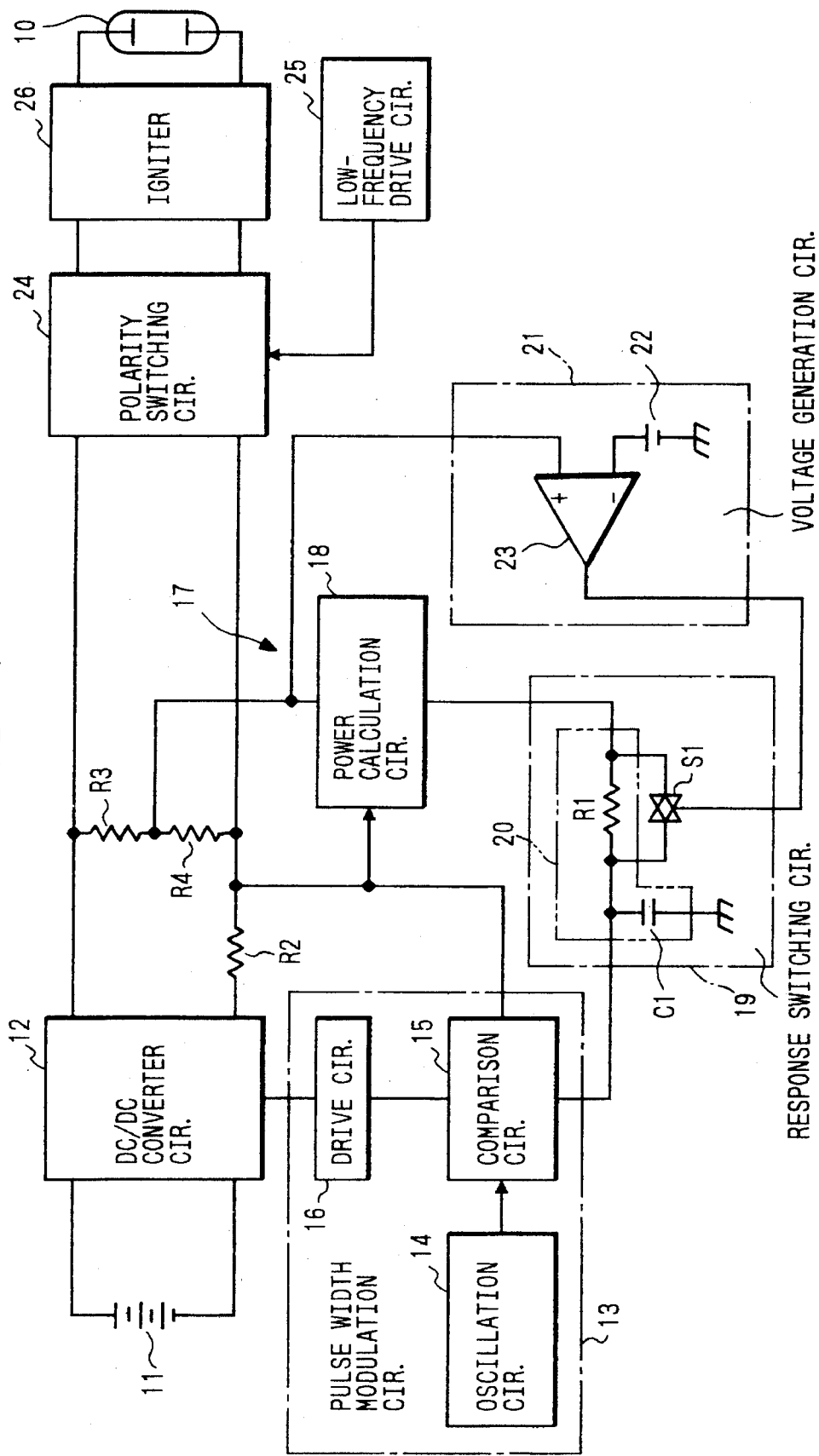
FIG. 1 is a circuit diagram showing a discharge lamp lighting device according to a first embodiment of the present invention.

FIG. 1 shows a first embodiment of the invention. In FIG. 1, reference numeral 10 denotes a discharge lamp for a headlight etc, and numeral 11 denotes a DC voltage source. A DC/DC converter circuit 12 as an inverter circuit supplies power to the discharge lamp 10 by subjecting an output voltage of the DC voltage source 11 to DC/DC conversion that is performed by an on/off operation of a semiconductor switching element.

A pulse width modulation circuit 13 has an oscillation circuit 14 for generating a triangular wave, a comparison circuit 15 and a drive circuit 16, and controls an output power of the converter circuit 12 by changing the duty factor of the on/off switching of the switching element in the converter circuit 12.

A feedback control system 17 feedback-controls the converter circuit 12 to produce a necessary power for the discharge lamp 10, by detecting a lamp current Ila and a lamp voltage Vla of the discharge lamp 10. The feedback control system 17 detects the lamp current Ila by means of a resistor R2 and the lamp voltage Vla by means of resistors R3 and R4, and performs feedback control by causing the pulse width modulation circuit 13 to control the converter circuit 12, with the use of a power calculation circuit 18 and a response switching circuit 19.

Figure 13:
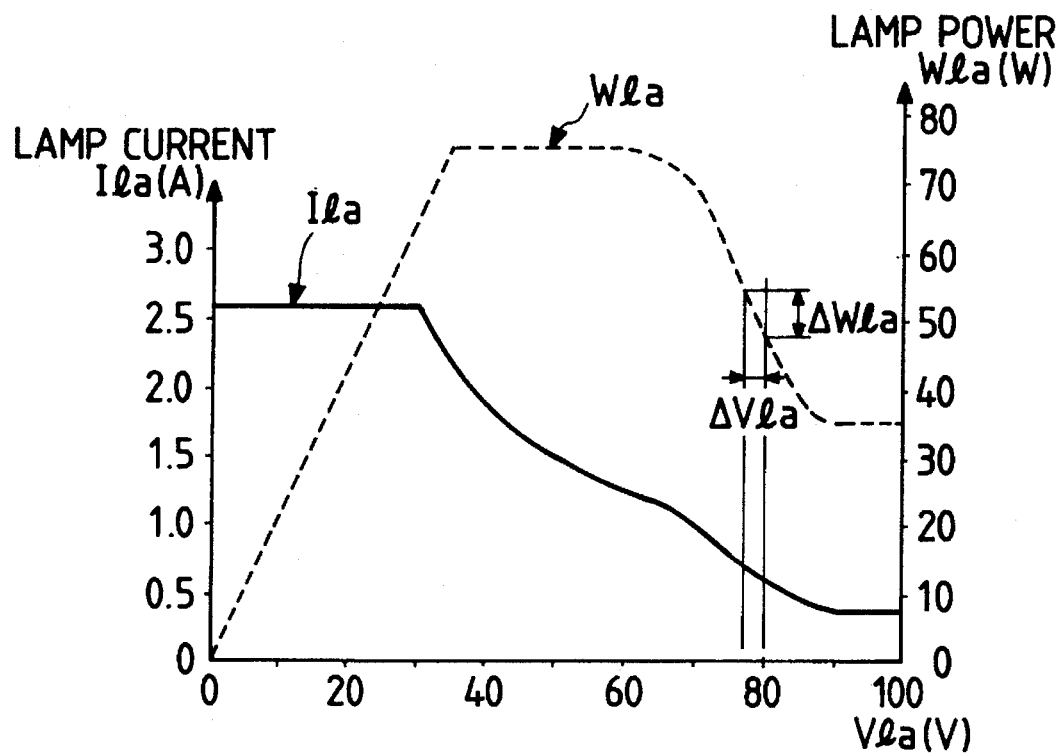
FIG. 13 is a graph showing a discharge lamp control characteristic.

Based on the detected lamp current and lamp voltage, the power calculation circuit 18 calculates a control signal to provide the control characteristic as shown in FIG. 13. The calculated control signal is input to the response switching circuit 19.

The response switching circuit 19 has a CR integration circuit 20 that consists of a resistor R1 and a capacitor C1 and determines an integration time constant, and a switching element S1, such as an analog switch, that is provided in parallel with the resistor R1 and serves to switch the integration time constant. The switching element S1 is driven by an output of a voltage detection circuit 21. The voltage detection circuit 21 has a comparator 23 for comparing the lamp voltage Vla as divided by the resistors R3 and R4 with a reference voltage of a reference voltage source 22. The comparator 23 drives the switching element S1 of the response switching circuit 19 in accordance with the level of the lamp voltage Vla by supplying it with a L signal when the divided lamp voltage Vla is lower than the reference voltage and with a H signal when the divided lamp voltage Vla is larger than the reference voltage.

Figure 14:
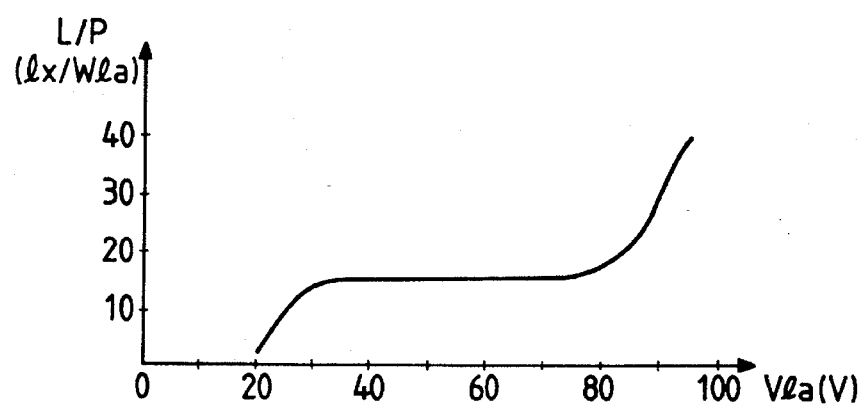
FIG. 14 is a graph showing a relationship between a luminous efficiency and a lamp voltage of the discharge lamp.
Figure 15:
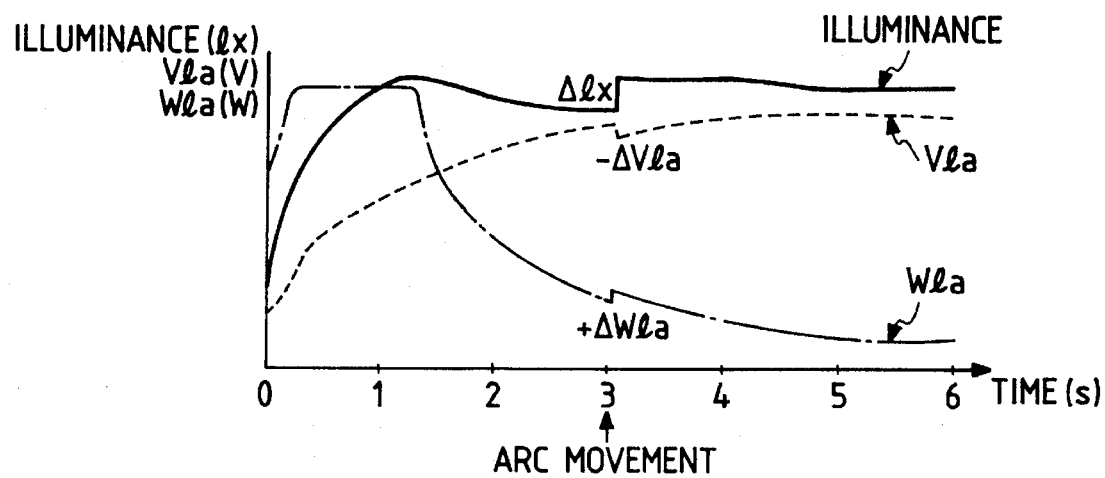
FIG. 15 is a waveform diagram showing discharge lamp lighting characteristics with a conventional lighting device.

Based on the output signal of the comparator 23, the response switching circuit 19 operates in the following manner to switch the response speed of the feedback control system 17. That is, in view of the lamp voltage vs. luminous efficiency characteristic of FIG. 14, when the lamp voltage Vla is high, the switching element S1 is closed to cancel the integration time constant of the CR integration circuit 20. On the other hand, when the lamp voltage Vla is low, the switching element is opened to effect the integration time constant.

In the pulse width modulation circuit 13, the control signal passed through the response switching circuit 19 is input to the comparison circuit 15. The comparison circuit 15 determines the duty factor in accordance with the control signal and the lamp current Ila using the triangular wave signal supplied from the oscillation circuit 14. The pulse width modulation circuit 13 controls the output power of the converter circuit 12 by driving the switching element of the converter circuit 12 through the drive circuit 16.

A polarity switching circuit 24 is of the full-bridge type. To prevent the cataphoresis phenomena, in which color separation of the tube and deviation of the light-emitting portion occur when the discharge lamp 10 is driven by a voltage of a fixed polarity, two pairs of switching elements of a full-bridge are alternately turned on by a low-frequency drive circuit 25 to convert the output of the converter circuit 12 to a low-frequency AC rectangular wave. The low-frequency AC rectangular wave is supplied to the discharge lamp 10 through an igniter 26, which generates a high-voltage pulse for starting the discharge lamp 10.

Next, a detailed description will be made of an operation at the time of turning on the discharge lamp 10.

First, the converter circuit 12 produces a starting voltage (about 300 V) necessary to start the discharge lamp 10. And one pair of switching elements of the polarity switching circuit 24 is turned on to apply the starting voltage to the discharge lamp 10. At the same time, a high-voltage pulse (about 20 kV) generated by the igniter 26 is also applied to the discharge lamp 10 being superposed on the starting voltage, cause a dielectric breakdown in the tube.

As a result, the discharge tube 10 starts to light while transferring from glow discharge to arc discharge. During the start-up period, when the mercury vapor pressure is low and therefore the discharge lamp 10 has a low impedance, the lamp voltage Vla is about 20V.

On the other hand, in the feedback control system 17, the lamp current Ila and the lamp voltage Vla are respectively detected by the resistor R2 and the resistors R3 and R4, and the power calculation circuit 18 produces the control signal in accordance with the detected lamp current Ila and lamp voltage Vla to provide the control characteristic as shown in FIG. 13. The control signal thus obtained is input to the pulse width modulation circuit 13 through the response switching circuit 19.

The pulse width modulation circuit 13 determines the pulse duty factor based on the control signal and the lamp current Ila, and drives the switching element of the converter circuit 12 so that the output power of the converter circuit 12 satisfies the control characteristic of FIG. 13. The output voltage of the converter circuit 12 is converted by the polarity switching circuit 24 to the AC rectangular wave, which is supplied to the discharge lamp 10.

In the discharge lamp 10, mercury within the tube is vaporized while receiving thermal energy from the arc discharge. As a result, the mercury vapor pressure rapidly increases and the lamp voltage Vla increases accordingly.

Figures 3A, 3B, 3C, 3D:
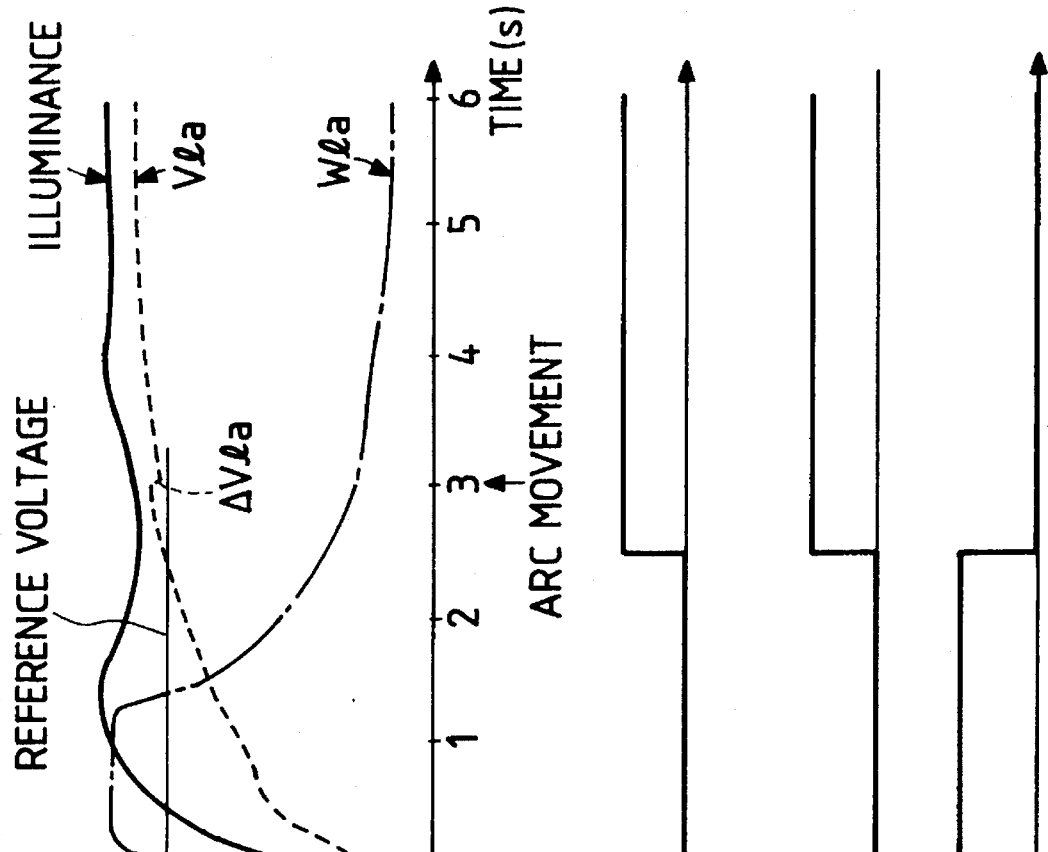
FIGS. 3(a)–3(d) are waveform diagrams showing the operation of the discharge lamp lighting device of the first embodiment.

The comparator 23 of the voltage detection circuit 21 compares the lamp voltage Vla as divided by the resistors R3 and R4 with the reference voltage. In the operational region in which the lamp voltage Vla is low and the luminous efficiency of the discharge lamp 10 is also low, the (divided) lamp voltage Vla is lower than the reference voltage as shown in FIG. 3(a), the comparator 23 outputs a H signal as shown in FIG. 3(d). In response to the H signal sent from the comparator 23, the switching element S1 of the response switching circuit 19 is closed to short-circuit the resistor R1, as shown in FIG. 3(b). In this case, since the integration time constant of the CR integration circuit 20 is canceled, the response speed of the feedback control system 17 is fast as shown in FIG. 3(c).

The fast response speed is employed in this operational region, because in this region the lamp voltage Vla rapidly increases to quickly change characteristics of the discharge lamp 10. If the response speed of the feedback control system 17 were not fast, the control would not be effected properly because of a delay.

Since the luminous efficiency of the discharge lamp 10 is low in this region, the variation $\Delta$lx of the lamp illuminance is very small even when the arc discharge points vary on the electrodes, to cause no flicker.

Furthermore, in this operational region, since only a short time has elapsed from the start of the discharge lamp 10, the discharge points on the electrodes are hotter than the remaining portions, there is almost no possibility that the arc discharge points move.

As the discharge lamp 10 continues to light and the mercury vapor pressure within the tube increases, both of the lamp voltage Vla and the luminous efficiency of the discharge lamp 10 increase as shown in FIG. 3(a). Since the lamp voltage Vla as divided by the resistors R3 and R4 is higher than the reference voltage (see FIG. 3(a)), the comparator 23 outputs a L signal as shown in FIG. 3(d).

In response to the L signal, the switching element S1 of the response switching circuit 19 is opened as shown in FIG. 3(d). Since the control signal from the power calculation circuit 18 is integrated with the time constant T=R1×C1 of the CR integration circuit 20 that consists of the resistor R1 and the capacitor C1, the response speed of the feedback control system 17 is slow as shown in FIG. 3(c).

In this operational region, as shown in FIG. 3(a), the lamp characteristics approach their stable states and the lamp voltage Vla and the lamp current Ila vary slowly. Therefore, even if the control signal is integrated with the time constant T, a delay in the control operation does not adversely affect the lamp characteristics.

On the other hand, in this operational region, since a certain time has elapsed from the start of the discharge lamp 10 and a temperature difference between the discharge points and the remaining portions on the electrodes is small, the arc discharge points may move on the electrodes. If the lamp voltage Vla is changed as shown in FIG. 3(a) by a movement of the discharge arc, the control signal output from the power calculation circuit 18 reflects this variation $\Delta$Vla.

Figure 2:
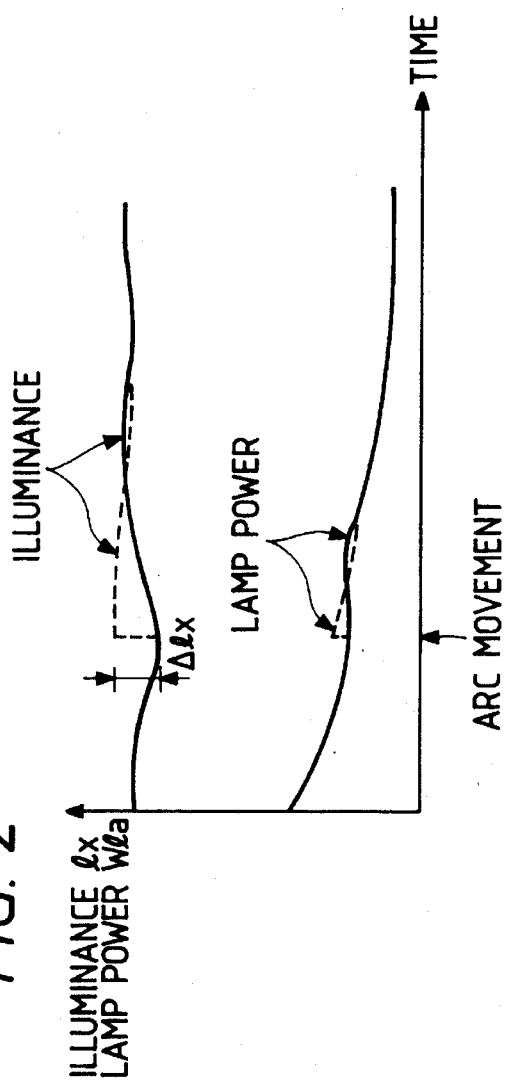
FIG. 2 is a waveform diagram showing how illuminance and lamp power vary when arc discharge points move on electrodes of a discharge lamp.

However, since the switching element S1 of the response switching circuit 19 is opened (see FIG. 3(b)) to render the feedback control system 17 in the slow response state, the integration time constant of the CR integration circuit 20 of the response switching circuit 19 causes the control signal to change slowly. As a result, as shown in FIG. 2, the power supplied from the converter circuit 12, which is controlled by the pulse width modulation circuit 13, to the discharge lamp 10 is varied in accordance with the control signal more slowly (indicated by a solid line in FIG. 2) than in the conventional case (indicated by a dashed line).

Therefore, even when the arc discharge points move on the electrodes, the illuminance of the discharge lamp 10 varies more slowly (indicated by a solid line in FIG. 2) than in the conventional case (indicated by a dashed line). Although an absolute illuminance variation $\Delta$lx remains the same, a time-differential value dlx/dt can be made small, so that the illuminance variation will not be recognized by human eyes. This is so because an illuminance variation is averaged in visual recognition if dlx/dt is smaller than a certain value, due to the time constant of the physiological reaction from the retina to the cerebrum and the visual system's function of adding-up temporal variations of light (Bloch's law).

In this embodiment, based on experiments, the integration time constant of the CR integration circuit 20, which consists of the resistor R1 and the capacitor C1, is set at 0.8 second.

As described above, according to the first embodiment, the voltage detection circuit 21 detects the lamp voltage Vla, and the response switching circuit 19 switches the response speed of the feedback control system 17 such that the response speed is lowered when the lamp voltage Vla reaches the stable-state voltage minus 10V, based on the fact that the lamp voltage Vla has a correlation with the luminous efficiency and that the lamp characteristics and the frequency of discharge arc movements rapidly vary in the operational region in which the lamp voltage Vla is low.

The response speed may be switched by detecting the variation rate of the lamp voltage Vla (see FIGS. 4 and 5) or the illuminance variation of the discharge lamp 10.

Figure 5:
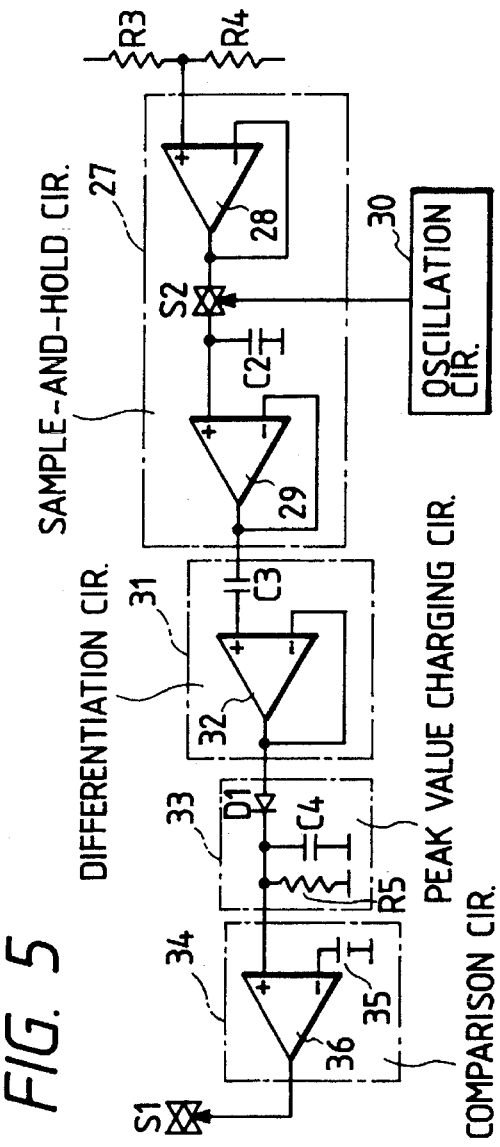
FIG. 5 is a circuit diagram showing the main part of the discharge lamp lighting device of FIG. 4.
Figure 4:
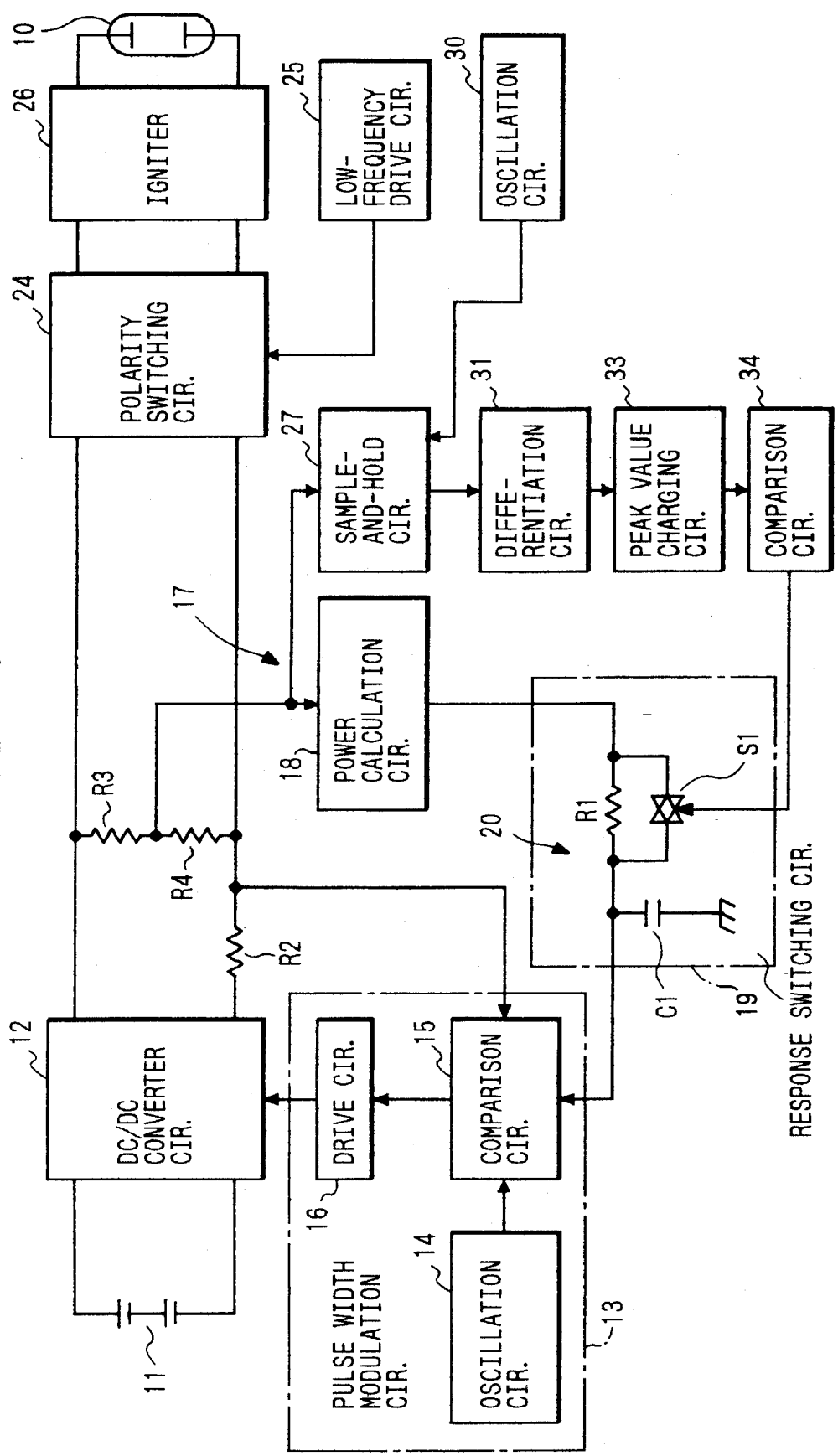
FIG. 4 is a circuit diagram showing a discharge lamp lighting device according to a second embodiment of the invention.

FIGS. 4 and 5 show a second embodiment of the invention, in which the variation rate of the lamp voltage Vla is detected and the response speed of the feedback control system 17 is switched by the response switching circuit 19 in accordance with the detected variation rate.

After the lighting start of the discharge lamp 10, the lamp voltage Vla rapidly increases with the increase of the mercury vapor pressure within the tube, and the variation rate decreases as the lamp voltage Vla approaches its stable-state value. Therefore, it is possible to obtain a condition for switching the response speed by detecting the variation rate of the lamp voltage Vla.

In FIGS. 4 and 5, a sample-and-hold circuit 27 has buffer amplifiers 28 and 29, a switching element S2 and a capacitor C2, and samples and holds the lamp voltage Vla as divided by the resistors R3 and R4 in accordance with the oscillation period of an oscillation circuit 30. A differentiation circuit 31 has a capacitor C3 and a buffer amplifier 32, and differentiates an output of the sample-and-hold circuit 27 to determine a variation rate of the lamp voltage Vla with respect to the oscillation period of the oscillation circuit 30.

A peak value charging circuit 33 has a diode D1, a capacitor C4 and a resistor R5, and converts an output of the differentiation circuit 31 to a smooth signal indicating the variation rate of the lamp voltage Vla. A comparison circuit 34 has a reference voltage source 35 and a comparator 36. Comparing an output of the peak value charging circuit 33 with a reference voltage, the comparison circuit 34 closes the switching element S1 of the CR integration circuit 20 when the variation rate of the voltage Vla is larger than the reference voltage and opens it when the variation rate is smaller than the reference voltage.

In this embodiment, as shown in FIGS. 6(a)–6(c), the lamp voltage Vla as divided by the resistors R3 and R4 is sampled and held by the circuit 27 in accordance with the oscillation period of the oscillation circuit 30. More specifically, the lamp voltage Vla as divided by the resistors R3 and R4 is input to the switching element S2 through the buffer amplifier 28 that electrically separates its input and output. When an output of the oscillation circuit 30 is H, the switching circuit S2 is closed to charge the capacitor C2 with the signal sent through the buffer amplifier 28. When the output of the oscillation circuit 30 becomes L, the switching circuit S2 is turned off. In this case, since the input impedance of the buffer amplifier 29 is very high, the capacitor C2 does not discharge, i.e., keeps its voltage.

Then, when the output of the oscillation circuit 30 again becomes H, the switching element S2 is closed to charge the capacitor C2 with the signal sent through the buffer amplifier 28. In this case, since the capacitor C2 has held the voltage built up while the output of the oscillator was previously H (the capacitor C2 is separated from the buffer amplifier 28 by the switching element S2), it is quickly charged by an amount corresponding to an increase of the lamp voltage Vla during the L-output period of the oscillation circuit 30. By repeating the above operation, the circuit 27 samples and holds the lamp voltage Vla as divided by the resistors R3 and R4 in accordance with the oscillation period of the oscillation circuit 30 as shown in FIGS. 6(b) and 6(c).

By differentiating the output of the sample-and-hold circuit 27, the differential circuit 31 produces a signal indicating the variation rate of the lamp voltage Vla with respect to the oscillation period of the oscillation circuit 30, as shown in FIG. 6(d). More specifically, the capacitor C3 picks up only the edge portions of the output signal of the sample-and-hold circuit 27, which varies in a step-like manner, and the extracted edge portions are passed through the buffer amplifier 32. Since the buffer amplifier 29 operates on a single voltage source, a sudden drop of the lamp voltage Vla due to a discharge arc movement is not output from the buffer amplifier 29 because it corresponds to a minus output.

After the variation rate is determined by the differentiation circuit 31, the peak value charging circuit 33 converts the output of the differentiation circuit 31 to a smooth signal indicating the variation rate of the lamp voltage Vla as shown in FIG. 6(e). Since triangular wave peaks of the output of the differentiation circuit 31 represent the variation rate of the lamp voltage Vla, the peak value charging circuit 33 is constructed such that the capacitor C4 is charged with the output of the differentiation circuit 31 through the diode D1 and the diode D1 allows the capacitor C4 to discharge only through the resistor R5. With this constitution, the peak value charging circuit 33 converts the variation rate of the lamp voltage Vla to a smooth signal by charging the capacitor C4 at every triangular wave peak of the output of the differentiation circuit 31.

The comparator 36 of the comparison circuit 34 compares the output of the peak value charging circuit 33 with the reference voltage. As shown in FIG. 6(f), the comparator 36 outputs a H signal when the output of the peak value charging circuit 33 is higher than the reference voltage, and outputs a L signal when it lower than the reference voltage.

Since the switching element S1 of the CR integration circuit 20 is controlled by the output of the comparison circuit 24, the switching element S1 is closed when the variation rate of the lamp voltage Vla is higher than the reference voltage, and is opened when it is lower than the reference voltage so that the control signal changes slowly by virtue of the integration time constant of the CR integration circuit 20 (see FIGS. 6(g) and 6(h)).

In the second embodiment, like the case of the first embodiment, the illuminance of the discharge lamp 10 changes slowly and such an illuminance change is not recognized by human eyes even when the discharge arc points move on the electrodes.

Figure 7:
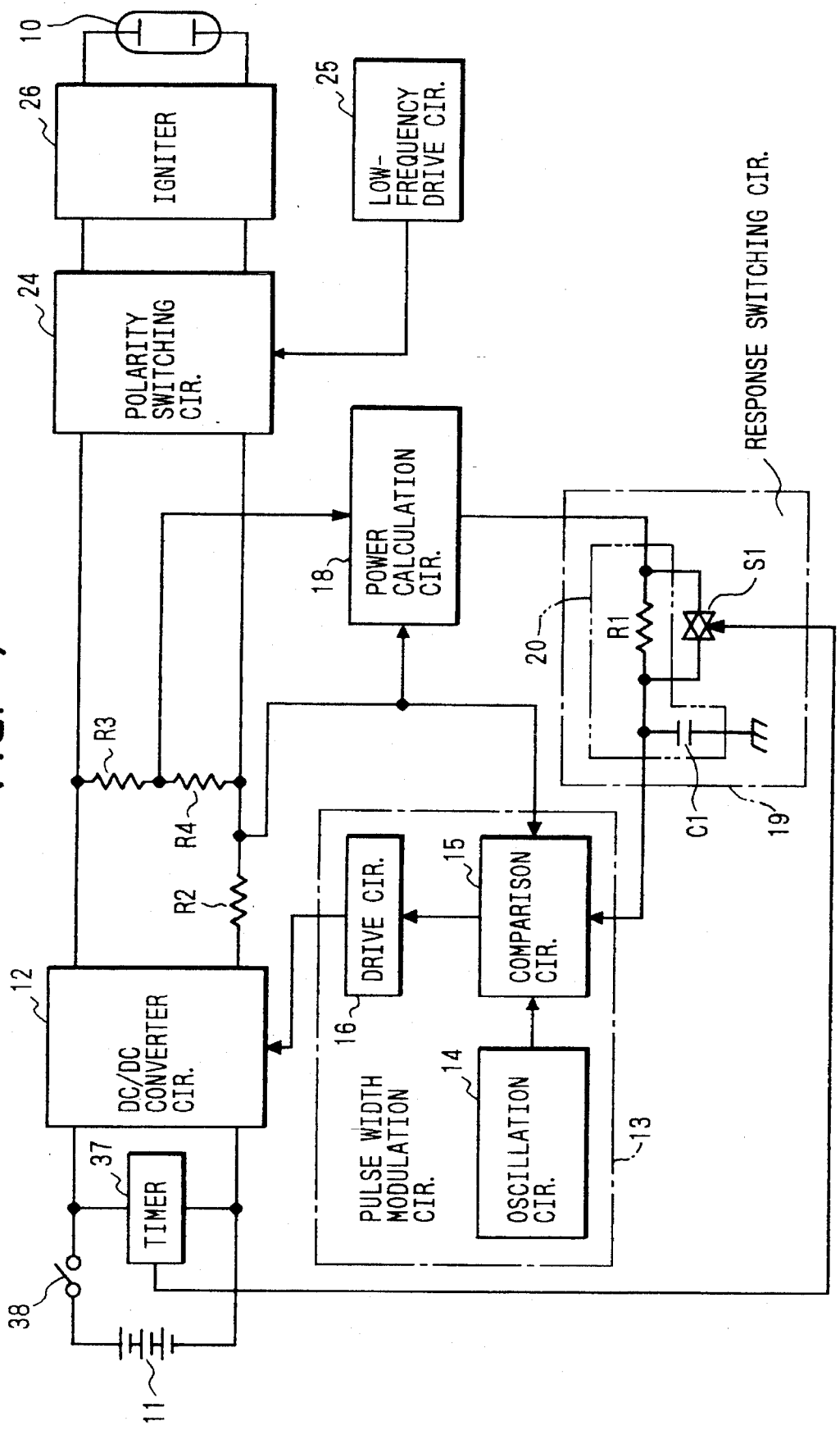
FIG. 7 is a circuit diagram showing a discharge lamp lighting device according to a third embodiment of the invention.

FIG. 7 shows a third embodiment of the invention, in which the response speed is made high during a predetermined period after the power-on, and is made low after a lapse of the predetermined period. In FIG. 7, a time 37 starts to operate when a power switch 38 is turned on, and turns off the switching element S1 of the response switching circuit 19 when the predetermined time has just passed.

In this embodiment, immediately after the power switch 38 is turned on to start the discharge lamp 10, the switching element S1 is closed to make the response speed high. After a lapse of the predetermined period, the switching element S1 turns off in response to a signal sent from the timer 37, to lower the response speed. Also in this embodiment, after a lapse of the predetermined period, the illuminance of the discharge lamp 10 changes slowly and an illuminance change is not recognized by human eyes even when the discharge arc points move on the electrodes.

Figure 8:
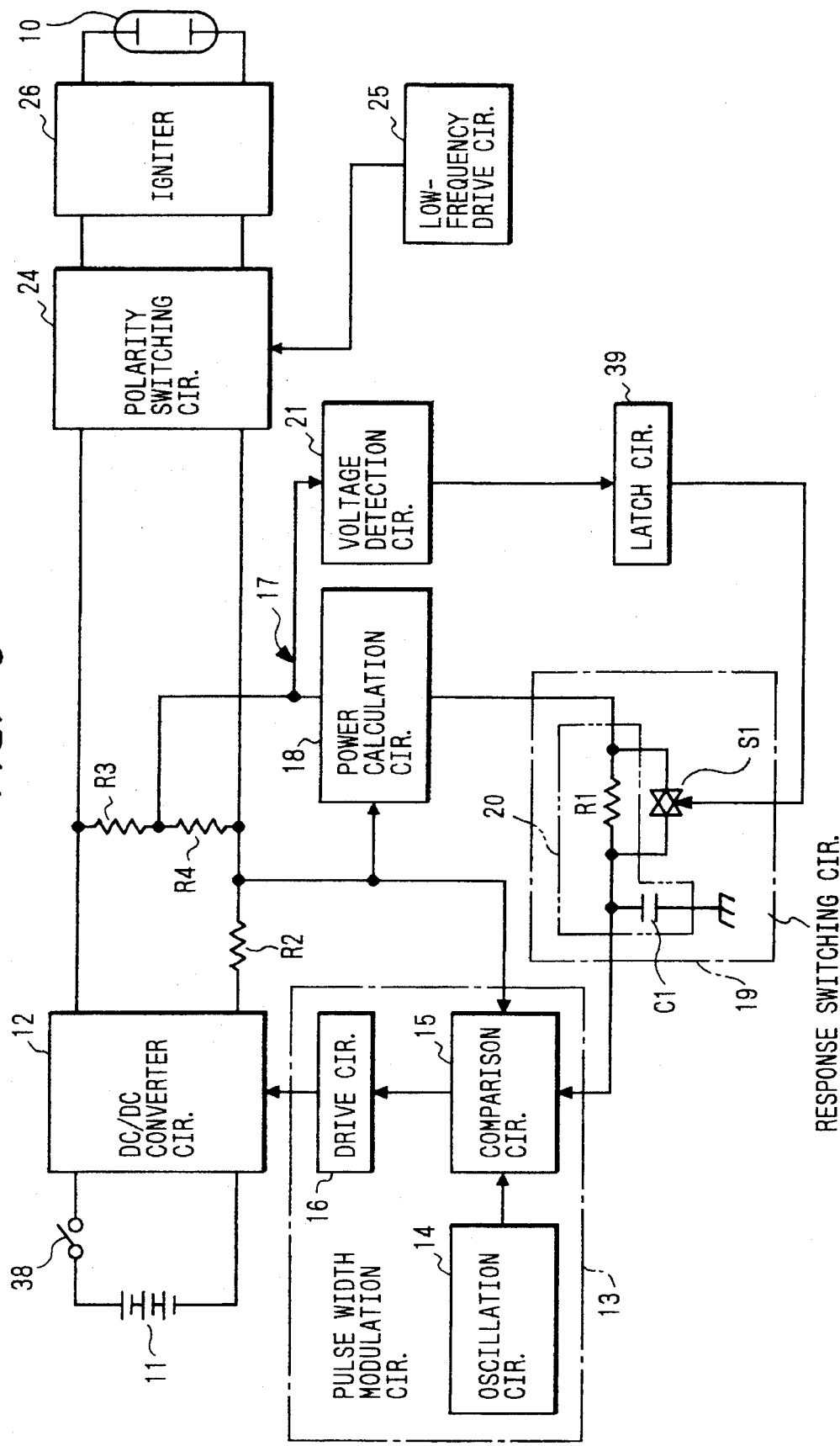
FIG. 8 is a circuit diagram showing a discharge lamp lighting device according to a fourth embodiment of the invention.

FIG. 8 shows a fourth embodiment of the invention. In this embodiment, after the switching from the fast-response state to the slow-response state, the slow-response state is kept until the discharge lamp 10 is put out. The fast-response state is restored at the time of restarting the discharge lamp 10.

More specifically, after the lamp voltage Vla as detected by the voltage detection circuit 21 transfers to the high-voltage region, a latch circuit 39 keeps the switching element S1 of the response speed switching circuit 19 in the off state until the discharge lamp 10 is put out.

Since the latch circuit 39 maintains the slow-response state once the switching element S1 is turned off to switch the response speed of the feedback control system 17 to the low speed, no erroneous operation will occur in the lighting device even when the characteristics of the discharge lamp 10 are changed by, for instance, a movement of the arc discharge points on the electrodes. In addition, the latch circuit 39 is reset when the discharge lamp 10 is put out by turning off the power switch 38 (no voltage is supplied to the latch circuit 39). Therefore, when the discharge lamp 10 is restarted by turning on the power switch 38, the response speed of the feedback control system 17 has been necessarily restored to the high speed.

Figure 9:
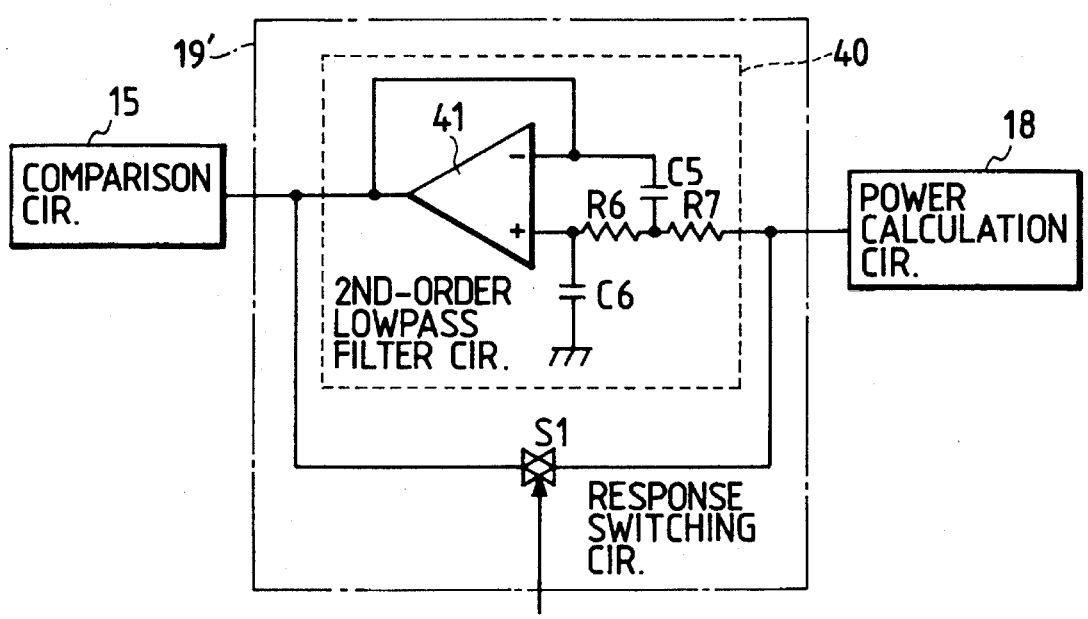
FIG. 9 is a circuit diagram showing the main part of the discharge lamp lighting device of FIG. 8.
Figure 10:
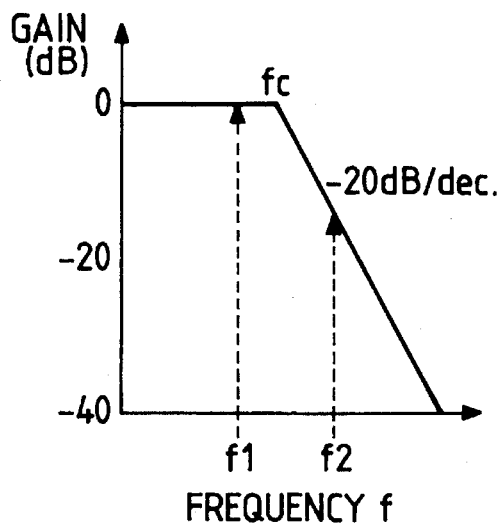
FIG. 10 shows a gain-frequency characteristic of a response switching circuit used in the first to fourth embodiments.

FIG. 9 shows a fifth embodiment of the invention, in which the CR integration circuit 20 of the response switching circuit 19 employed in the above embodiments is replaced by a second-order lowpass filter circuit 40.

Where the response switching circuit 19 is constituted of the CR integration circuit 20 as in the above embodiments, a cutoff frequency fc of the CR integration circuit 20 is so set that a frequency f1 which corresponds to the temporal variation of the control characteristic is lower than the cutoff frequency fc (see FIG. 10).

When the arc discharge points move on the electrodes, a component having a frequency f2 appears in the output of the power calculation circuit 18, which component represents a rapid change as a cause of a flicker of the discharge lamp 10. Since the frequency f2 is higher than the frequency f1 (corresponds to the temporal variation of the control characteristic) and is on a decay line of −20 dB/dec., this component is integrated with a decay of −20 dB/dec. with respect to the cutoff signal fc, so that it is not recognized as a flicker.

However, although the CR integration circuit 20 provides a decay of −20 dB/dec. for a component having a frequency higher than the cutoff frequency fc, it may not sufficiently remove and integrate the flicker-causing component of frequency f2 if f1 and f2 are close to each other.

Where sufficient integration cannot be performed by a first-order lowpass filter circuit such as the CR integration circuit 20, it is effective to use a second-order lowpass filter circuit 40 as shown in FIG. 9.

In FIG. 9, the second-order lowpass filter 40 as the integration means is a voltage source type lowpass filter circuit consisting of resistors R6 and R7, capacitors C5 and C6 and an operational amplifier 41. If it is assumed that R6=R7= R, the following relationships hold between the cutoff frequency fc and the circuit constants: $C5=1/\sqrt{2}\pi Rfc$ and $C6= \frac{1}{2}\sqrt{2}\pi Rfc$.

Figure 11:
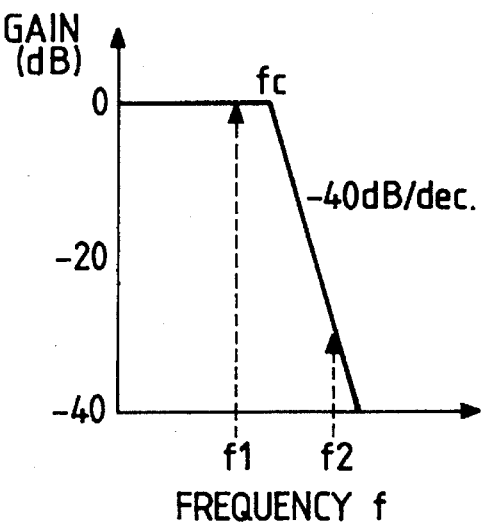
FIG. 11 shows a gain-frequency characteristic of a response switching circuit used in a fifth embodiment of the invention.
Figure 12:
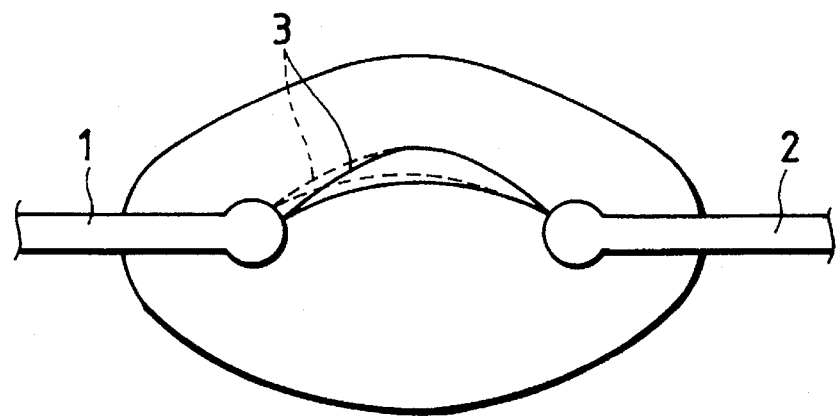
FIG. 12 illustrates a movement of a discharge arc of the discharge lamp.

Therefore, as shown in FIG. 11, a component having a frequency higher than the cutoff frequency fc is subjected to a decay of −40 dB/dec. Compared to the case of the CR integration circuit 20, an additional decay of −20 dB/dec. is obtained by the second-order lowpass filter circuit 40 if the cutoff frequency fc is the same. Therefore, the lowpass filter circuit 40 can perform sufficient integration even under the condition under which the CR integration circuit 20 cannot do.

Where even the second-order lowpass filter circuit 40 cannot perform sufficient integration, a higher order (e.g., third-order or fourth-order) lowpass filter circuit may be used to provide sufficient integration. In the case of an Nth-order lowpass filter, the decay rate with respect to the cutoff frequency fc is −20×N dB/dec.

Also in the fifth embodiment, while the switching element S1 is open, the control signal from the power calculation circuit 18 is converted to a slow-response signal by the second-order lowpass filter circuit 40, and then supplied to the comparison circuit 15. While the switching element S1 is closed, the control signal passes through the second-order lowpass filter circuit 40 with the response speed not reduced, and then supplied to the comparison circuit 15.

Although the above embodiments are directed to the discharge lamp lighting device which lights the discharge lamp 10 by applying the low-frequency AC rectangular wave to it, the invention can similarly be applied to a discharge lamp lighting device of a high-frequency lighting type.

The response switching circuit 19 may be an integration circuit using an operational amplifier instead of the CR integration circuit 20.

As described above, according to the invention, since the response speed control circuit switches the response speed of the feedback control system so that the response speed is high in the region where the luminous efficiency of the discharge lamp is low, and is low in the region where the luminous efficiency is high, a flicker can be prevented even when the arc discharge points move on the electrodes. Thus, the invention can provide the inexpensive discharge lamp lighting device which is simple in constitution and allows the discharge lamp to produce high-quality light.

What is claimed is:

1. A discharge lamp lighting device comprising:

an inverter circuit for producing a proper electric power to be supplied to a discharge lamp;

a feedback control system for detecting a lamp voltage and a lamp current, or a lamp power of the discharge lamp, and for feedback-controlling the inverter circuit based on the detected at least one of the lamp voltage, lamp current and lamp power; and a response switching circuit for switching a response speed of the feedback control system so that the response speed is high in a low luminous efficiency region, and is low in a high luminous efficiency region.

2. The discharge lamp lighting device of claim 1, wherein the response switching circuit switches the response speed of the feedback control system so that the response speed is high in a region where the lamp voltage is low, and is low in a region where the lamp voltage is high.

3. The discharge lamp lighting device of claim 1, wherein the response switching circuit switches the response speed of the feedback control system so that the response speed is high in a region where a variation rate of the lamp voltage is large, and is low in a region where the variation rate of the lamp voltage is small.

4. The discharge lamp lighting device of claim 1, wherein the response switching circuit switches the response speed of the feedback control system so that the response speed is high until a predetermined period elapses after power-on of the discharge lamp lighting device, and is low after a lapse of the predetermined period.

5. The discharge lamp lighting device of claim 1, further comprising a latch circuit for keeping the response speed low once the response switching circuit switches the response speed of the feedback control system from a fast speed to a slow speed.

6. The discharge lamp lighting device of claim 1, wherein the response switching circuit comprises a lowpass filter circuit of an Nth order where N is an integer not less than two.

* * * * *